(12) United States Patent
Swindler et al.

(10) Patent No.: US 8,047,223 B2
(45) Date of Patent: *Nov. 1, 2011

(54) GAUGE ASSEMBLY HAVING A STOP FILL DEVICE

(75) Inventors: Danny E. Swindler, Prosper, TX (US); Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/696,827

(22) Filed: Jan. 29, 2010

(65) Prior Publication Data

US 2010/0206387 A1 Aug. 19, 2010

Related U.S. Application Data

(63) Continuation of application No. 11/932,587, filed on Oct. 31, 2007, now Pat. No. 7,654,281, which is a continuation of application No. 11/023,664, filed on Dec. 28, 2004, now Pat. No. 7,293,578.

(60) Provisional application No. 60/538,279, filed on Jan. 22, 2004, provisional application No. 60/572,143, filed on May 18, 2004.

(51) Int. Cl.
*F16K 31/16* (2006.01)
(52) U.S. Cl. ......... 137/447; 137/442; 137/446; 141/198
(58) Field of Classification Search .................. 137/441, 137/442, 446, 416, 420, 447, 1; 73/317; 141/198
See application file for complete search history.

(56) References Cited

U.S. PATENT DOCUMENTS

| 4,064,907 A * | 12/1977 | Billington et al. ......... 137/614.2 |
| 7,293,578 B2 * | 11/2007 | Swindler et al. ............... 137/447 |
| 7,654,281 B2 * | 2/2010 | Swindler et al. ............... 137/447 |

* cited by examiner

*Primary Examiner* — Craig Schneider
*Assistant Examiner* — Craig J Price
(74) *Attorney, Agent, or Firm* — Howison & Arnott, L.L.P.

(57) ABSTRACT

A gauge assembly includes an indicator for providing an indication of an amount of fluid in a tank and a stop-fill assembly for stopping the flow of fluid flowing into the tank once the fluid reaches a particular level. The gauge assembly has a shaft that rotates as the fluid level changes in the tank. The indicator translates the rotational position of the shaft into a fluid level. The stop-fill assembly moves from an open position, where fluid can flow into the tank, to a closed position, where fluid is prohibited from flowing into the tank, depending on the rotational position of the shaft.

20 Claims, 12 Drawing Sheets

GAUGE ASSEMBLY HAVING A STOP FILL DEVICE

CROSS-REFERENCE TO RELATED APPLICATIONS

This application is a continuation of U.S. patent application Ser. No. 11/932,587, filed Oct. 31, 2007, and entitled GAUGE ASSEMBLY HAVING A STOP FILL DEVICE, published in U.S. Patent Application Publication US 2008/0053533 A1 on Mar. 6, 2008, now U.S. Pat. No. 7,654,281, issued Feb. 2, 2010. U.S. Patent Application Publication US 2008/0053533 A1 is incorporated by reference in its entirety into this application.

U.S. patent application Ser. No. 11/932,587 is a continuation of U.S. patent application Ser. No. 11/023,664, filed Dec. 28, 2004, and entitled GAUGE ASSEMBLY HAVING A STOP FILL DEVICE, now U.S. Pat. No. 7,293,578, issued on Nov. 13, 2007. U.S. Pat. No. 7,293,578 is incorporated by reference in its entirety into this application.

U.S. patent application Ser. No. 11/023,664 claims the benefit of U.S. Provisional Application No. 60/538,279, filed Jan. 22, 2004, entitled GAUGE ASSEMBLY, and of U.S. Provisional Application No. 60/572,143, filed May 18, 2004, entitled GAUGE ASSEMBLY HAVING A STOP FILL DEVICE.

TECHNICAL FIELD

This invention relates to a device capable of providing an indication of a fluid level in a tank and capable of transitioning a tank inlet between a state where fluid-flow is obstructed and a state where fluid-flow is allowed.

BACKGROUND

There are many different types of containers, tanks, vessels, and canisters that are used for storing fluids. For convenience, this document will use the term "tank" throughout to refer to what could be any kind of container, vessel, canister, tank, or the like.

It is often desirable to allow for monitoring of the fluid level in a tank, particularly in cases where the tank is such that the fluid cannot conveniently be visually inspected. For this reason, many tanks are provided with devices for communicating a fluid level, for example through the use of a fluid-level gauge that can provide an indication of the amount of fluid present in a tank. There are many known examples of fluid level gauges that use a float or a capacitance to mechanically and/or electrically drive an indicator.

It is also desirable in some cases to provide a stop-fill device for preventing a tank from being over-filled. Known stop-fill devices include those intended to be used in tanks that require a fluid to pass through an inlet valve in order to enter the tank. Typically, such stop-fill devices include a float that rides on the surface of the fluid in the tank. As fluid is added to the tank, the float rises to a certain level at which point it causes, for example by releasing a spring, the inlet valve to close. Once the inlet valve is closed, no additional fluid can be added to the tank.

SUMMARY

The present invention provides a single assembly capable of serving as a fluid level gauge, a stop-fill device, or a combination of both. Included is a rotary function for both driving a dial and/or for activating a valve, thus reducing cost and number of parts, as well as providing a simplified operation.

According to one aspect of the present invention, a gauge assembly is provided that comprises a shaft that rotates according to a change in fluid level, an indicator for providing an indication of the fluid level based on a rotational position of the shaft, and a stop-fill assembly for transitioning between an open configuration and a closed configuration based on the rotational position of the shaft. In one variation, a gauge assembly for a tank includes a body defining a port accessible from outside a tank that allows fluid to be moved in and out of the tank, a shaft that rotates according to a change in fluid level within the tank and an indicator for providing an indication external to the tank of the fluid level in the tank based on a rotational position of the shaft. In one aspect, the gauge assembly is provided with a stop-fill assembly that transitions between an open configuration and a closed configuration based on the rotational position of the shaft. The stop fill assembly includes a valve shuttle that is rotationally engaged with, but longitudinally independently movable from, the shaft so as to rotate with the shaft when the shaft rotates but so as to translate longitudinally independent of the shaft to move between an open position corresponding with the open configuration and a closed position corresponding with the closed configuration as the shaft rotates. In another aspect, the stop-fill assembly includes a valve body having a release slot. The valve shuttle has a release rib that does not engage the release slot when the stop-fill assembly is in the open configuration, but translates longitudinally into the release slot when the valve shuttle rotates into the closed position and the stop-fill assembly is in the closed configuration.

The stop-fill assembly can include a valve shuttle that rotates in conjunction with the rotation of the shaft and moves between an open position corresponding with said open configuration and a closed position corresponding with said closed configuration based on the rotational position of the shaft. The valve shuttle can include a flow surface at an angle to the direction of fluid flow when fluid is flowing into the tank such that the pressure of fluid flowing across the flow surface assists in rotating the valve shuttle from the open position to the closed position. The stop-fill assembly is designed taking into consideration the controlling pressure zones throughout the flow path. The flow surface in a preferred embodiment also has two or more vanes for the purpose of imparting rotational force to the stop-fill assembly. The stop-fill assembly can include a valve body having a release slot, and the valve shuttle can have a retaining rib that engages with the release slot when the stop-fill assembly is in the closed configuration. The valve shuttle can have an upper shaft, and the gauge assembly can further comprise an indicator-driving member for coupling with the indicator in order to translate a rotational position of the upper shaft into a fluid level. The valve shuttle can include a blocking member that blocks fluid flow when the valve shuttle is in the closed position.

According to another aspect of the present invention, a method of gauging and controlling fluid flow is provided that comprises the steps of rotating a shaft as fluid level in a tank changes, translating a rotational position of the shaft into a fluid level, and transitioning a stop-fill assembly between an open configuration and a closed configuration based on the rotational position of the shaft.

According to yet another aspect of the present invention, a gauge assembly is provided that comprises a shaft that rotates according to a change in fluid level and a stop-fill assembly having a valve shuttle that rotates in conjunction with the rotation of the shaft and moves between an open position and a closed position. The valve shuttle can include a flow surface that is at an angle to the direction of fluid flow such that the pressure of fluid flowing across the flow surface assists in rotating the valve shuttle from the open position to the closed position. In a preferred embodiment, the shuttle is provided with vanes in the flow path to impart rotational force to the valve shuttle.

BRIEF DESCRIPTION OF THE DRAWINGS

The present invention is illustrated by way of example and is not limited by the figures of the accompanying drawings, in which like reference numbers indicate similar parts.

DETAILED DESCRIPTION

Figures 1, 2:
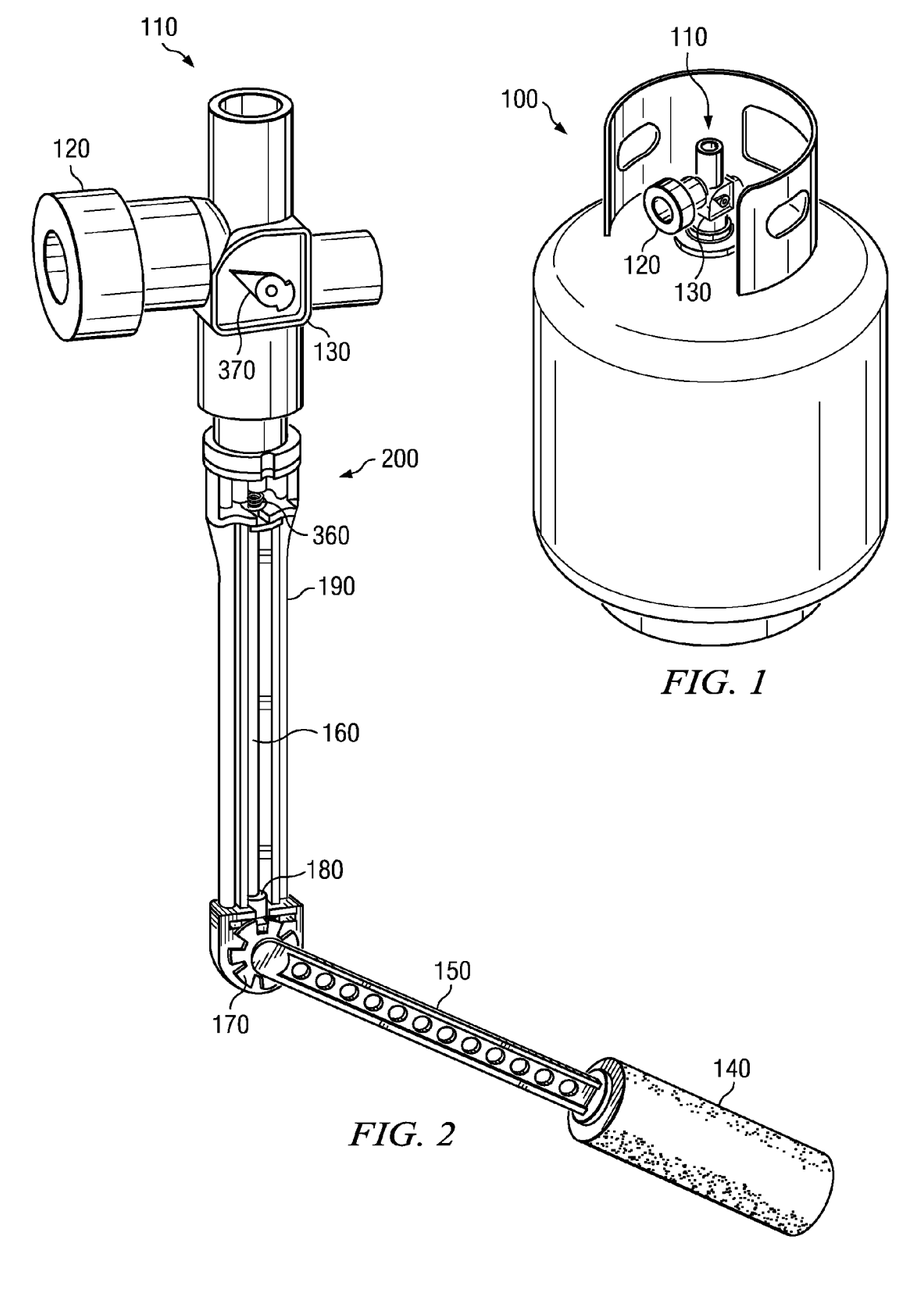
FIG. 1 shows a perspective view of a tank suitable for use with the present stop-fill device.
FIG. 2 shows a perspective view of a gauge assembly incorporating the present stop-fill device.

The present invention will now be described with reference to the drawings. FIG. 1 shows a perspective view of a tank 100 having a gauge assembly 110 according to the present invention. FIG. 2 shows a perspective view of the gauge assembly 110. It will be appreciated that the tank 100 is shown for exemplary purposes only and is in no way intended to limit the scope of the present invention.

The gauge assembly 110 includes a port 120 that is accessible from outside the tank 100. The port 120 allows fluid to be moved in and out of the tank 100. The gauge assembly 110 also includes an indicator 130 for providing an indication of the fluid level in the tank 100. In the present embodiment, the indicator 130 is a dial-type indicator, but any type of indicator could be used without departing from the spirit and scope of the present invention.

Figure 7:
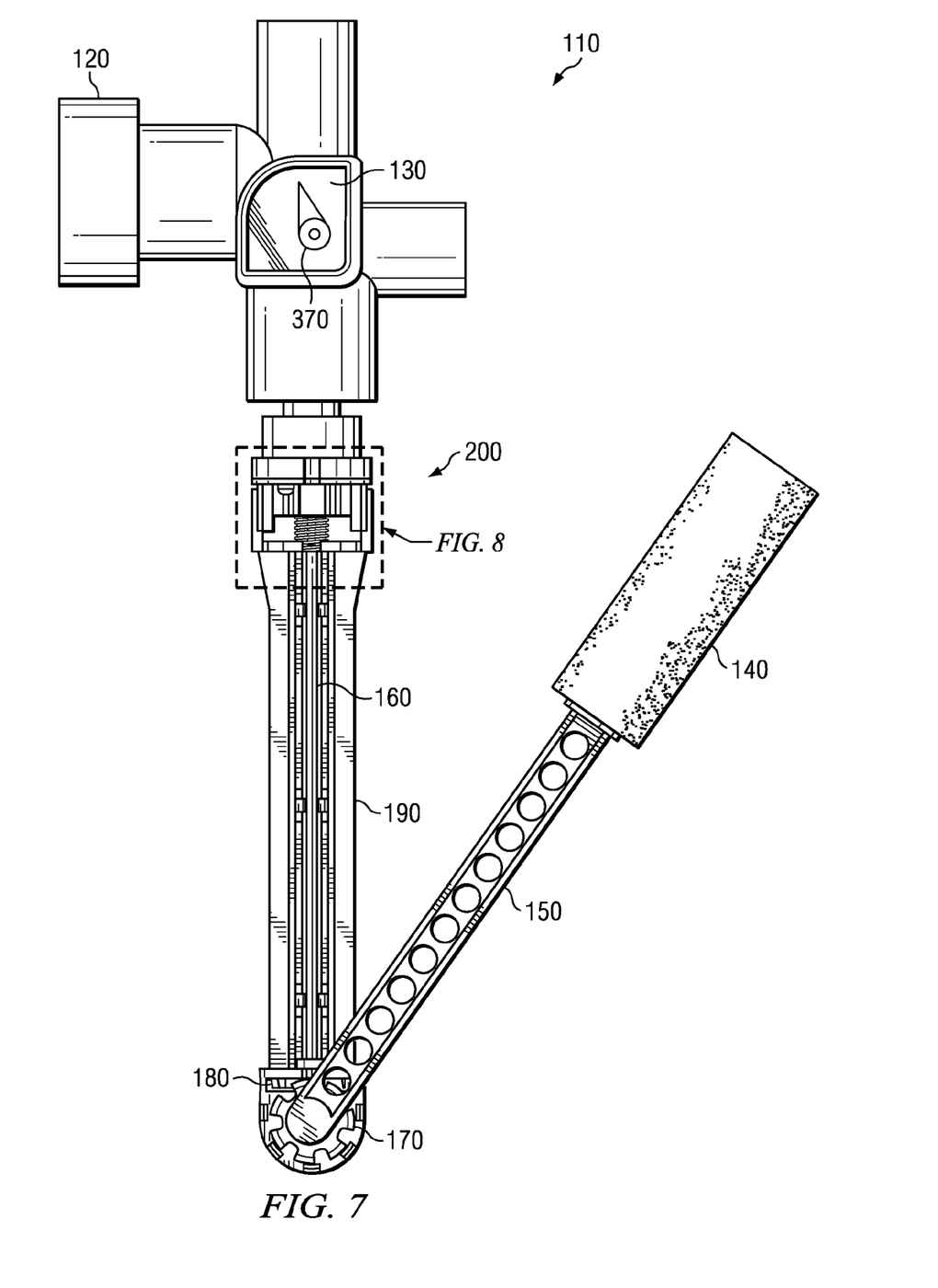
FIG. 7 is an orthogonal view of the gauge assembly shown in FIG. 2 in an alternate position.

As shown in FIG. 2, the gauge assembly 110 includes a stop-fill assembly 200, a support member 190, a vertical shaft 160 disposed within the support member 190, a float 140 and a float arm 150. The float 140 can be made of close foam material, and the vertical shaft 160, the support member 190, and the float arm 150 can be made of any rigid material, including an acetal such as Delrin®. A distal end of the float arm 150 is fixed to the float 140, and a proximal end of the float arm 150 is connected to the vertical shaft 160 such that the float arm 150 is rotatable about the base of the vertical shaft 160. As the fluid level in the tank 100 changes, the float 140 moves up or down with the fluid level causing the float arm 150 to rotate about the base of the support member 190. The float arm 150 is shown in an alternate position in FIG. 7. Rotation of the float arm 150 about the base of the support member 190 causes the vertical shaft 160 to rotate about the longitudinal axis of the vertical shaft 160. In the present embodiment, the rotation of the float arm 150 is translated to the rotation of the vertical shaft 160 by a sector gear 170, fixed to the proximal end of the float arm 150 that engages a pinion gear 180, fixed to the lower end of the vertical shaft 160.

Figure 3:
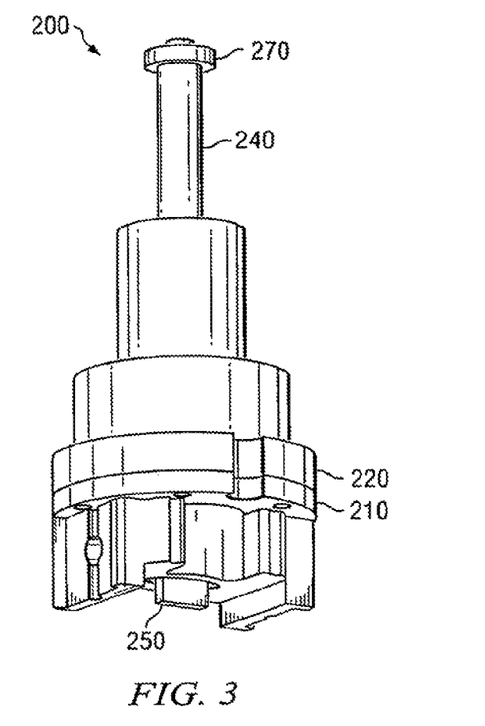
FIG. 3 is a perspective view of the stop-fill assembly included in the gauge assembly shown in FIG. 2.
Figure 4:
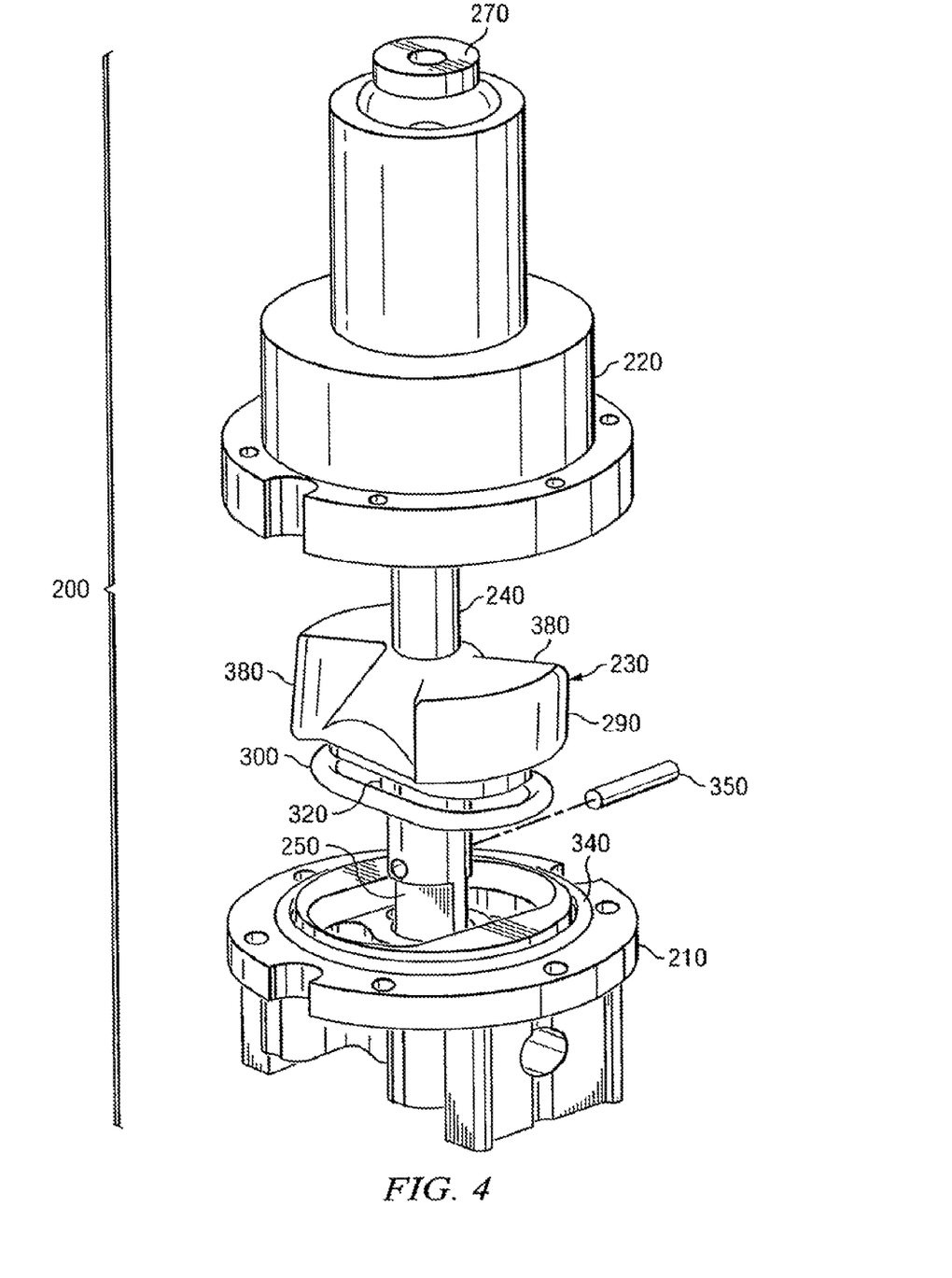
FIG. 4 is an exploded view of the stop-fill assembly shown assembled in FIG. 3.
Figure 5:
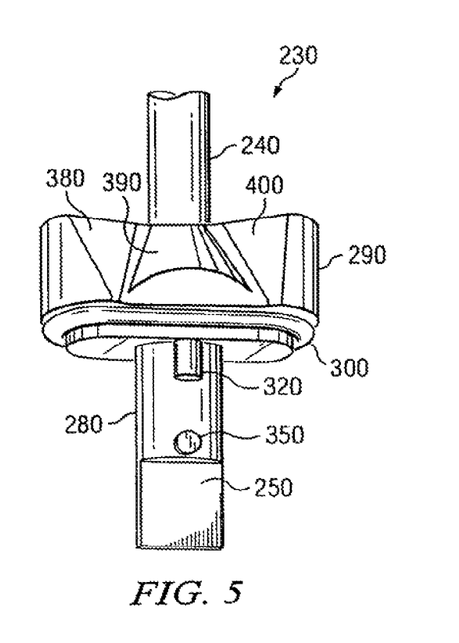
FIG. 5 is a perspective view of a valve shuttle included in the stop-fill assembly shown in FIGS. 3 and 4.
Figure 6:
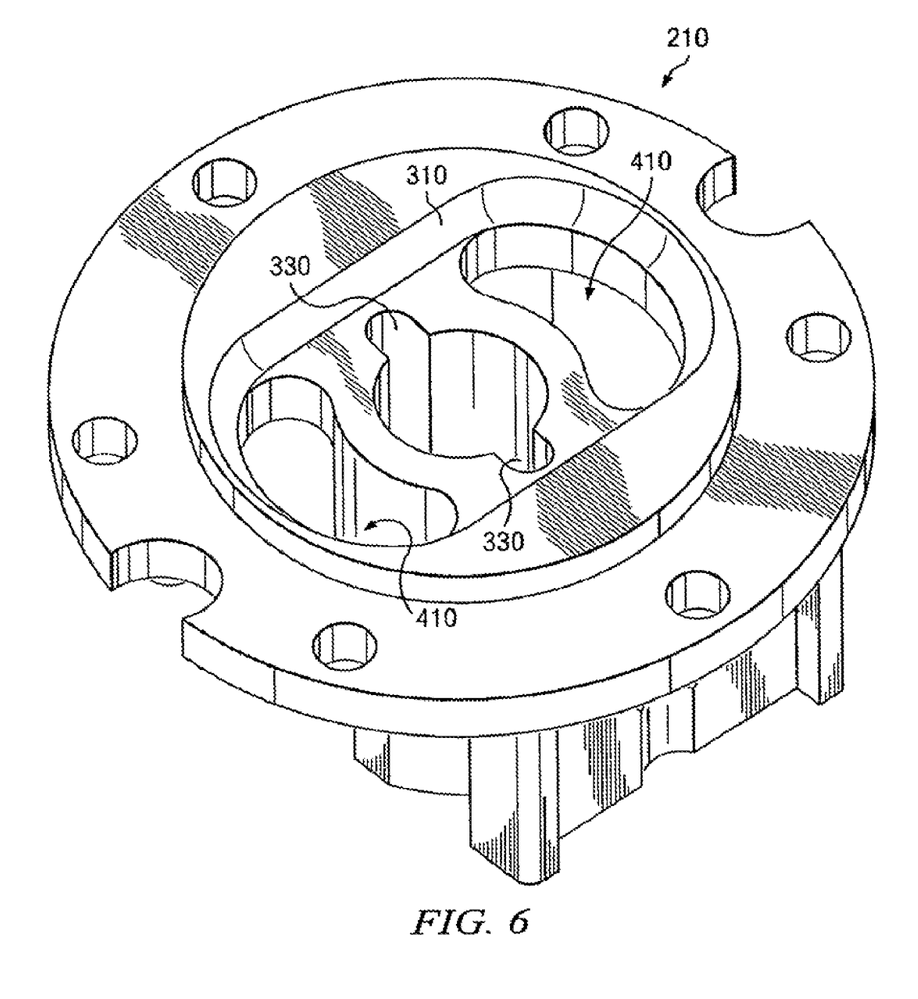
FIG. 6 is a perspective view of a valve body included in the stop-fill assembly shown in FIGS. 3 and 4.

The stop-fill assembly 200 is fixed to an upper end of the support member 190. FIG. 3 shows a perspective view of the stop-fill assembly 200, and FIG. 4 shows an exploded view of the stop-fill assembly 200. The stop-fill assembly 200 includes a valve body 210 (also shown in FIG. 6), a valve head 220, and a valve shuttle 230 (also shown in FIG. 5), all of which can be made of any rigid material, including an acetal such as Delrin®.

Figure 8:
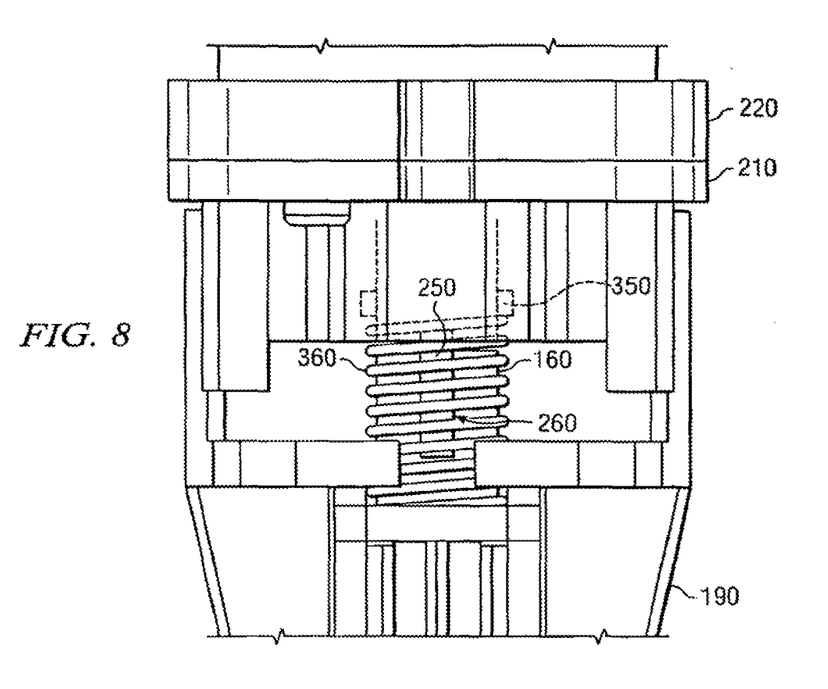
FIG. 8 is an enlarged view of the area in FIG. 7 designated as 8.

The valve shuttle 230 has a shuttle body 290 that serves as a blocking member for blocking fluid flow, an upper shaft 240 that extends upwardly from the shuttle body 290 through the valve head 220, and a lower shaft 280 that extends downwardly from the shuttle body 290. A magnet 270 that serves as an indicator-driving member is fixed to an upper end of the upper shaft 240 for driving the indicator 130. A tab 250 is formed in the lower end of the lower shaft 280 for engaging with a slot 260 (see FIG. 8) formed in an upper end of the vertical shaft 160 in order to transmit rotary motion of the vertical shaft 160 to the valve shuttle 230. As the vertical shaft 160 rotates, the magnet 270 also rotates. The magnet 160 is coupled with a dial 370 of the indicator 130 such that the rotation of the magnet 270 causes rotation of the dial 370 according to known methods. The lower shaft 280 also includes an opposing pair of release ribs 320 (see, e.g., FIGS. 4 and 5) for engaging with an opposing pair of release slots 330 (see, e.g., FIG. 6) formed in the valve body 210 when the stop-fill assembly 200 is in a closed position.

It is contemplated that an indicator other than the one used in the present embodiment can be used that does not require the presence of the magnet 270. For example, an indicator-driving member such as an encoded disk could be used in place of the magnet 270 and an indicator could be used that optically couples with the encoded disk to translate the rotational position of the encoded disk into a fluid level. In fact, it is contemplated that any kind of indicator and/or indicator driving member can be used that translates the rotation of the upper shaft 240 into a fluid level.

The stop-fill assembly 200 includes an optional valve o-ring 300 for assisting in sealing the shuttle body 290 to a seal surface 310 of the valve body 210 when the stop-fill assembly is in the closed position. A seal 340 can optionally be provided for assisting in sealing the juncture between the valve head 220 and the valve body 210. Depending on how the valve body 210 is attached to the valve head 220, the seal 340 can be unnecessary, for example if the valve body 210 and valve head 220 are welded together, for example by ultrasonic welding. A spring retainer 350 is provided in a through-hole in the lower shaft 280 and extends from both sides of the lower shaft 280 in order to retain an upper end of a spring 360 (see FIG. 8). It will be appreciated that, instead of using a separate item as the spring retainer 350, the spring retainer 350 can instead be integrally formed in the valve shuttle 230.

Figure 9:
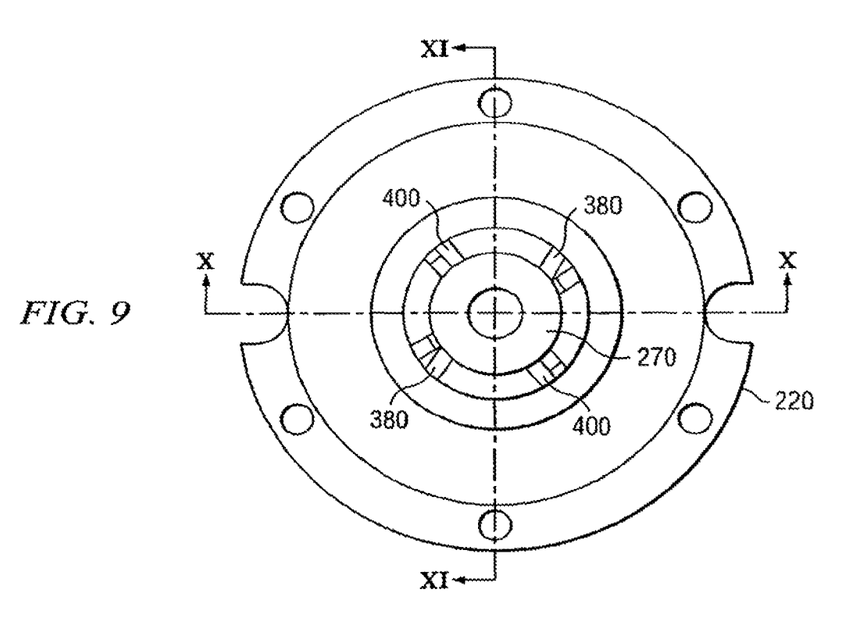
FIG. 9 is a top view of the stop-fill assembly in a closed position.
Figure 10:
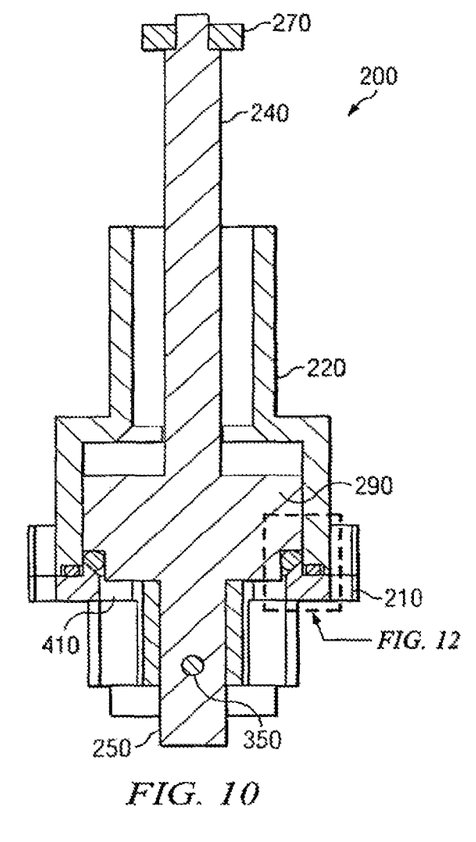
FIG. 10 is a cross-sectional view of the stop-fill assembly taken along section X-X in FIG. 9.
Figure 13:
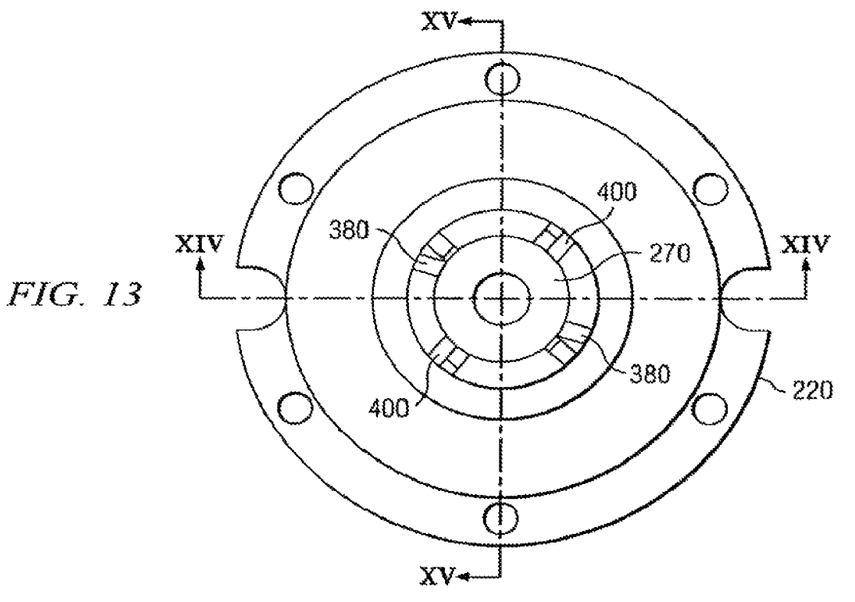
FIG. 13 is a top view of the stop-fill assembly in an open position.

The stop-fill assembly 200 can transition between an open position and a closed position. In the open position, fluid from the port 120 can flow through the stop-fill assembly 200, while in the closed position fluid from the port 120 is prevented from flowing through the stop-fill assembly 200. A top view of the stop-fill assembly 200 is provided in FIGS. 9 and 13, where FIG. 9 shows a top view of the stop-fill assembly 200 when in the closed position, and FIG. 13 shows a top view of the stop-fill assembly 200 when in the open position. FIGS. 10 and 11 show cross-sectional views and FIGS. 10A and 11A show partial cross-sectional views of the closed position along section lines X-X and XI-XI, respectively, of FIG. 9, while FIGS. 14 and 15 provide cross-sectional views of the open position along section lines XIV-XIV and XV-XV, respectively, of FIG. 13.

Figure 14:
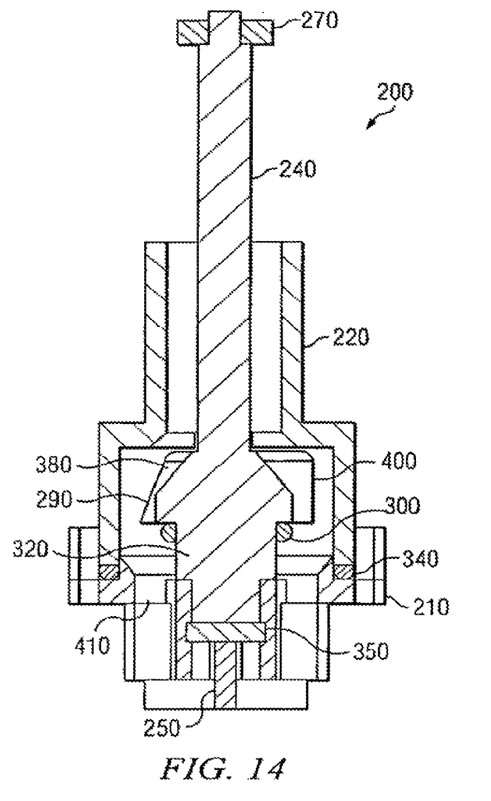
FIG. 14 is a cross-sectional view of the stop-fill assembly taken along section XIV-XIV in FIG. 13.
Figure 14A:
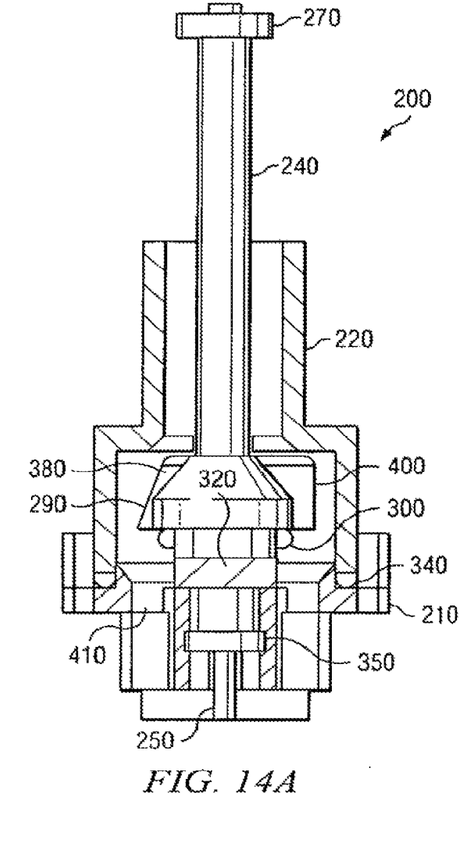
FIG. 14A is a partial cross-sectional view of the stop-fill assembly taken along section XIV-XIV in FIG. 13.
Figure 15:
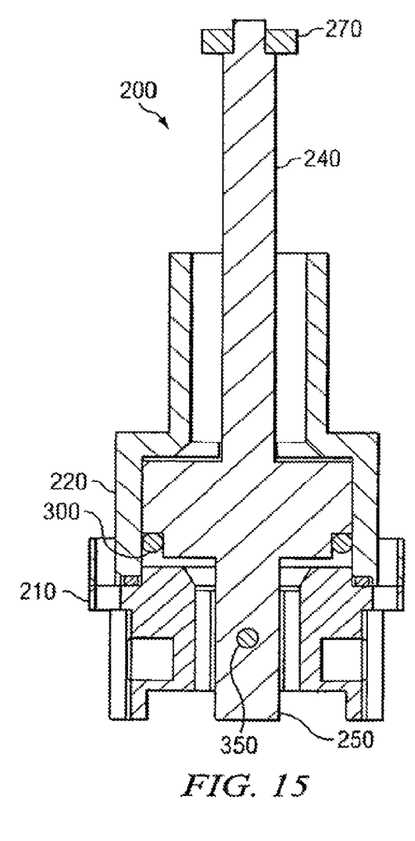
FIG. 15 is a cross-sectional view of the stop-fill assembly taken along section XV-XV in FIG. 13.
Figure 15A:
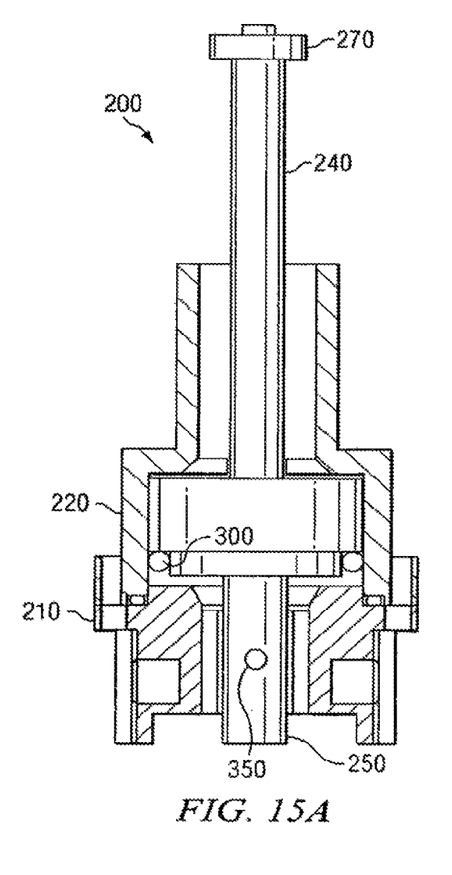
FIG. 15A is a partial cross-sectional view of the stop-fill assembly taken along section XV-XV in FIG. 13.

In the open position, as shown in FIGS. 14 and 15 and in FIGS. 14A and 15A, and under the pressure of incoming fluid from the port 120 pressing downward on the shuttle body 290, the release ribs 320 of the valve shuttle 230 ride against the upper surface of the valve body 210. Thus, as best shown in FIG. 14, the release ribs 320 are what keep the stop-fill assembly 200 open against the force of a fluid flow from the port 120. When the gauge assembly 110 is in the empty position (i.e., having the float arm 150 rotated to the position corresponding with an empty condition of the tank) the release ribs 320 are at 90 degree angles to the slots, sitting on the upper surface of the valve body 210 so that the valve shuttle 230 cannot go down. In this configuration, fluid from the port 120 travels downward through the space between the upper shaft 240 and the valve head 220, around the shuttle body 290 across flow surfaces 380, 390, 400, then through fill ports 410 en route to the inside of the tank 100.

Figure 10A:
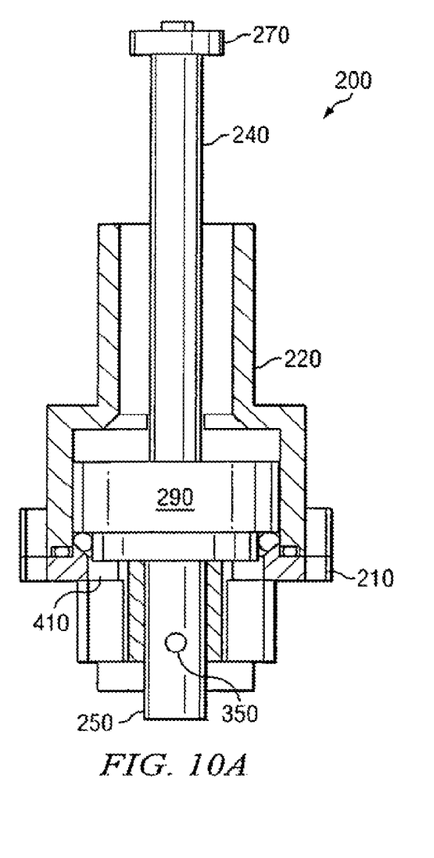
FIG. 10A is a partial cross-sectional view of the stop-fill assembly taken along section X-X in FIG. 9.
Figure 11:
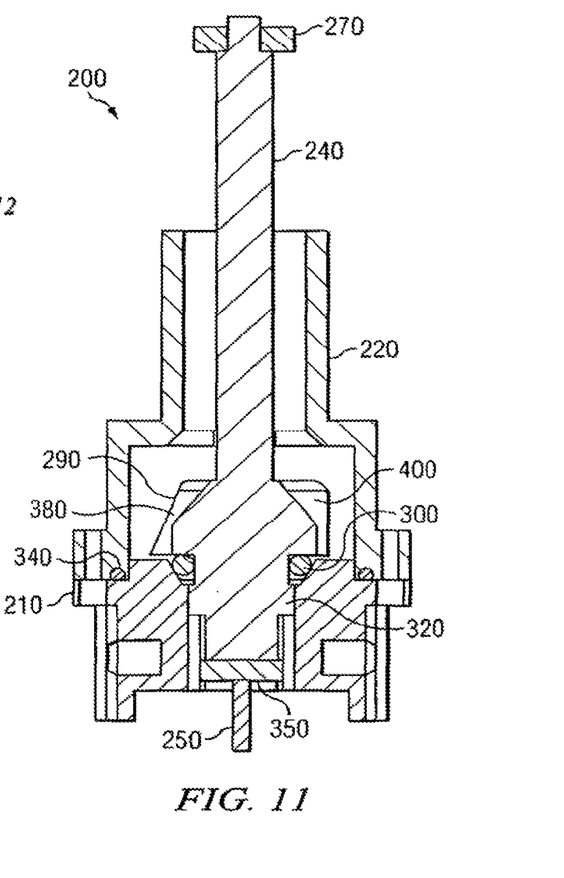
FIG. 11 is a cross-sectional view of the stop-fill assembly taken along section XIXI in FIG. 9.
Figure 11A:
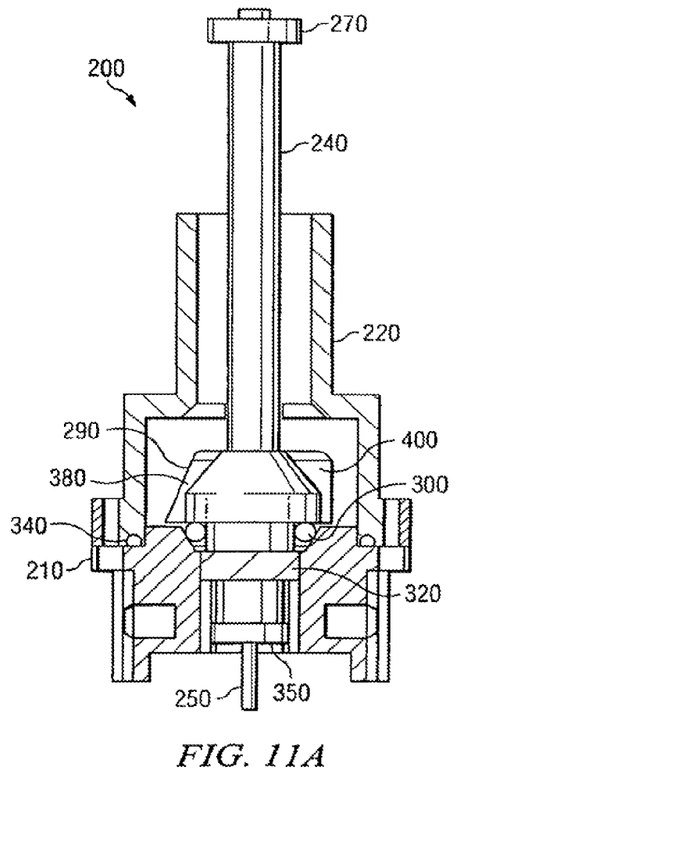
FIG. 11A is a partial cross-sectional view of the stop-fill assembly taken along section XI-XI in FIG. 9.
Figure 12:
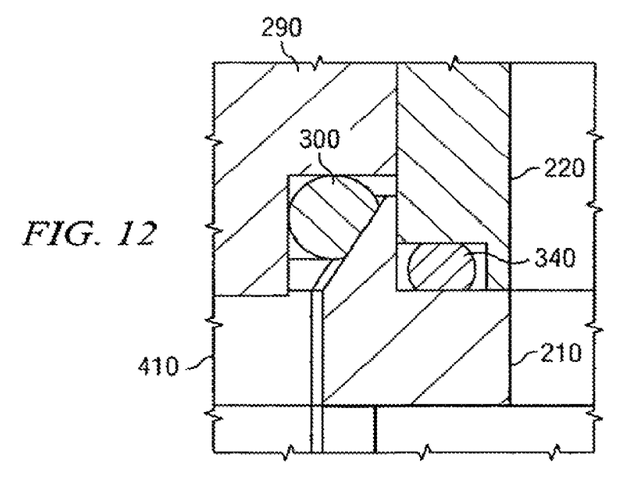
FIG. 12 is an enlarged view of the area in FIG. 10 designated as 12.

As the vertical shaft 160 rotates due to the motion of the float arm 150, the valve shuttle 230 rotates and eventually rotates to the position shown in FIGS. 10 and 10A and FIGS. 10 and 10A where the release ribs 320 line up with the release slots 330, which is best shown in FIG. 10. When this happens, the downward pressure of the fluid flow, which is sufficient to overcome the opposing pressure of the spring 360, causes the release ribs 320 to drop into the release slots 330 due to the force from the fluid flow. As shown in FIGS. 10 and 12, the shuttle body 290 acts as a blocking member since the contacting surfaces of the shuttle body 290 and the valve body 210 prevent fluid from traveling from the space above the shuttle body 290 to the fill ports 410 or into the tank 100. The optional valve o-ring 300 assists in sealing the junction between the shuttle body 290 to the valve body 210.

Once the stop-fill assembly 200 is in the closed position, filling of the tank 100 is halted and at some point the source of the incoming fluid is disconnected from the port 120 or the port 120 is closed. At this point, since there is no longer any pressure against the upper side of the valve shuttle 230, the valve shuttle 230 is moved upward under the force of the spring 360 so that the stop-fill assembly 200 transitions to the open position. This allows for fluid to exit the tank 100 by traveling back up through the stop-fill assembly 200 to the port 120.

In the present embodiment, the total rotation of the float arm 150 between full and empty fluid levels is approximately 100 degrees, while the total rotation necessary for moving the valve shuttle 230 between the open position and the closed position is pinion gear 180 is close to a one to one relationship. However, it will be appreciated that the angle of the range of motion of the float arm 150 can vary, for example based on the size and shape of the tank 100, and the angle of the range of motion of the valve shuttle 230 can vary, for example based on the requirements of the indicator 130. Thus the relationship between the sector gear 170 and the pinion gear 180 can vary so long as the relationship is such that it allows the angle of the range of motion of the float arm 150 and the angle of the range of motion of the valve shuttle 230 needed at the dial 370 of the indicator 130 to coincide.

In some cases there may be relatively high pressures against the shuttle body 290 due to the filling pressure and the fluid flow. The actual flotation or the buoyancy of the float 140 produces a relatively small torque, so friction between the release ribs 320 and the upper surface of the valve body 210 might be high and resist rotation of the valve shuttle 230. For this reason, it is desirable to keep the diameter of rotation of the release ribs 320 as small as practical to reduce the resisting torque. Since the torque felt by the valve shuttle 230 is tangential force times moment arm, reducing the moment arm (i.e., diameter of rotation of the release ribs 320) reduces the resisting friction torque. It is also desirable to form the valve shuttle 230, particularly the release ribs 320, and the valve body 210, particularly the upper surface thereof, from a material having a low coefficient of friction against itself, for example an acetal such as Delrin®. Another option is to provide a friction-reducing material (not shown), for example a Teflon® fill material, between the release ribs 320 and the upper surface of the valve body 210, that is made of a material having a low coefficient of fiction.

In addition, the flow surfaces 380 of the shuttle body 290 are slanted such that when fluid flows across the flow surface 380 the pressure of the fluid against the slanted surface will tend to rotate the valve shuttle 230 in a predetermined direction (clockwise in the present embodiment) to help overcome the fiction between the release ribs 320 and the upper surface of the valve body 210. Also, since fluid flow into the tank 100 across the slanted flow surfaces 380 will tend to rotate the valve shuttle 230 in a predetermined direction as the tank 100 is being filled, clearances are reduced or removed between portions of various parts, such as between portions of the tab 250 and the slot 260 and between portions of engaged teeth of the sector gear 170 and the pinion gear 180, while the tank 100 is being filled. For example, the slot 260 can be slightly wider than the thickness of the tab 250 to allow for the tab 250 to be longitudinally inserted and removed from the slot 260. As a consequence, the tab 250 would be free to rotate to some degree while inserted in the slot 260. Therefore, if the valve shuttle 230 is not provided with a slanted surface such as flow surface 380, turbulence from incoming fluid flowing across the valve shuttle 230 could cause unpredictable rotational motion of the valve shuttle 230. However, since the fluid flow across flow surfaces 380 tends to rotate the valve shuttle 230 in a predetermined direction, the tab 250 will be rotated, in the predetermined direction, relative to the slot 260 at or near a maximum degree allowed by the total clearance between the tab 250 and the slot 260 such that portions of the tab 250 contact portions of the slot 260. That is, a clearance is reduced or eliminated between portions of the tab 250 and the slot 260 as fluid is flowing into the tank 100. It will be appreciated that a clearance between portions of teeth of the sector gear 170 and the pinion gear 180 is also reduced or eliminated since the rotation of the valve shuttle 130 is transferred to push together engaging teeth of the pinion gear 180 and the sector gear 170 as fluid is flowing into the tank 100. Thus, with the slanted flow surface 380, clearances between portions of various parts are reduced or eliminated allowing a greater degree of accuracy to be achieved in predicting the location of the release ribs 320 relative to the release slots 330 while the tank 100 is being filled.

The shuttle and valve can be designed by considering control of the pressure zones through the flow path of the valve. The valve is preferably designed to create low-pressure zones above the shuttle and high-pressure zones below the shuttle. Such a design will tend to lessen the total downward force on the shuttle thus reducing the friction working against the desired rotation of the shuttle. The area of flow at various points along the flow path can be plotted and the pressure profile determined. Thus, the specific design of the chamber and the shuttle can be modified to change the pressure profile as desired.

Figure 16A:
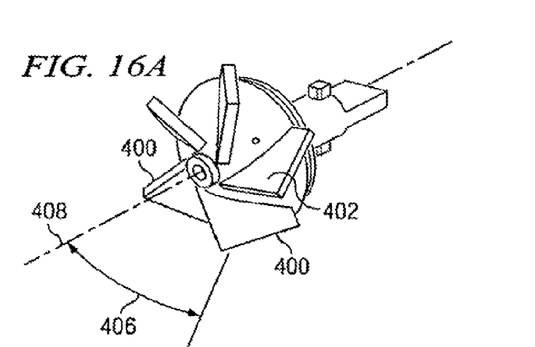
FIGS. 16A-D are perspective views of various valve shuttles having vanes.
Figure 16B:
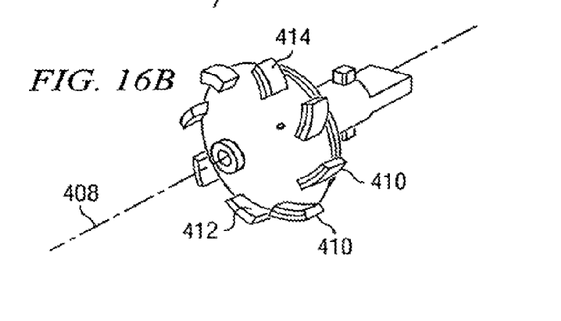
Figure 16C:
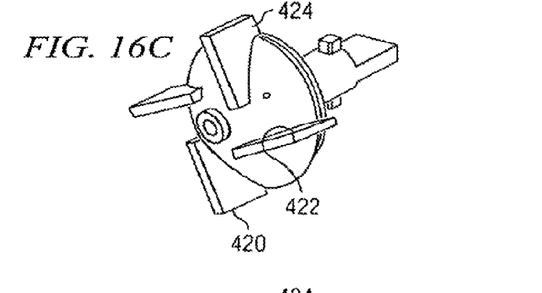
Figure 16D:
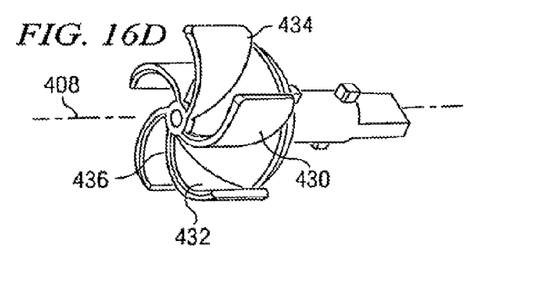
Figure 17A:
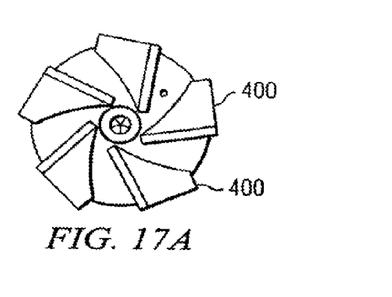
FIGS. 17A-D are perspective end views of the valve shuttles shown in FIGS. 16A-D.
Figure 17B:
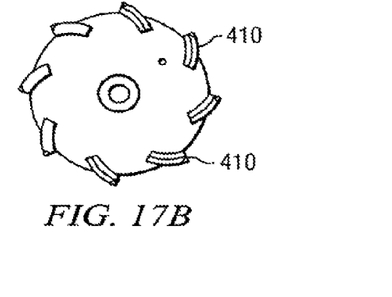
Figure 17C:
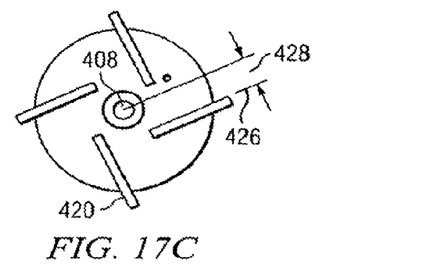
Figure 17D:
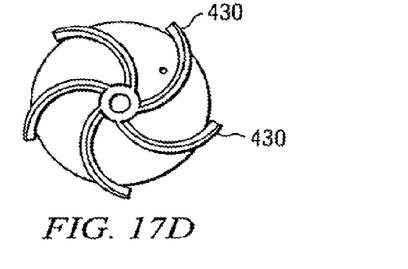

In the event that smooth slanted flow surfaces 380 are insufficient to provide the desired rotation force to valve shuttle 230 in a predetermined direction to help overcome the friction between the various portions of the valve shuttle which are in contact with the valve body, vanes can be provided on the valve shuttle of a predetermined shape and size to impart the desired rotational force to the valve shuttle in a predetermined direction. FIGS. 16A-D illustrated various useful configuration of vanes, and FIGS. 17A-D are end views of the respective figures in FIGS. 16A-D. Any desired shape of the vanes can be utilized, and while all of the illustrated vanes extend from the surface of the shuttle, it will be appreciated that vanes could be supplied in the form of grooves in the shuttle. FIGS. 16A and 17A show vanes 400 having a uniform thickness and having a substantially flat front side surface 402 and a substantially flat rear side (not shown). Vanes 400 are set at a predetermined angle 406 to shuttle axis 408. FIGS. 16B and 17B show vanes 410 in the shape of a curved plate of substantially uniform thickness and having a curved front side 412 and a curved rear side 414. The front and rear sides can be oriented such that they are substantially parallel to the shuttle axis 408. FIGS. 16C and 17D illustrate vanes 420 having a substantially uniform thickness and having a flat front side 422 and a flat rear side 424. The vanes have a longitudinal axis 426, which is perpendicular to the shuttle axis 408 and set off the shuttle axis a predetermined distance 428. FIGS. 16D and 17D illustrate vanes 430 having a substantially uniform cross-section and a curved front side 432 and a curved rear side 434. The inner end 436 of vanes 432 is adjacent to the shuttle axis 408 and surfaces of the front and rear side 432 and 434 are parallel to axis 408. While the vanes have been illustrated having substantially uniform thickness, it will be appreciated by those skilled in the art that they may have non-uniform thickness. The base where the vanes attach to the shuttle can be thicker than the other end. The flow of fluid across the vanes will assist in rotating the valve shuttle from the open position to the closed position. The vanes can be shaped such that the thickness of the vanes varies in the shape of an airfoil.

The spring 360 allows for the stop-fill assembly 200 to remain in the open position when not under the pressure of incoming fluid. However, in some cases the pressure of fluid in the tank 100 is sufficient to cause the valve shuttle 230 to move to the open position when the port 120 is open so that even without the spring 360 fluid can be removed from the tank 100.

It is contemplated that an arrangement other than the above embodiment having the float arm 150 can be used in conjunction with the present invention. One option is to use a spiral gauge having a float on the vertical shaft 160 where the vertical shaft 160 has a ramp going up such that, as the float moves up and down the vertical shaft 160, the shaft 160 rotates.

It is also contemplated that the device could be modified to eliminate the indicator or the stop-fill function. For example, the valve shuttle 230 could be replaced with a shaft so that the gauge assembly drives the indicator 130 but does provide stop-fill functionality. As another example, the indicator 130 and magnet 270 could be eliminated so that the gauge assembly has stop-fill functionality but not an indicator.

Although the present invention has been fully described by way of preferred embodiments, one skilled in the art will appreciate that other embodiments and methods are possible without departing from the spirit and scope of the present invention.

What is claimed is:

1. A stop fill assembly for an enclosed tank, the stop fill assembly comprising:
    a port accessible from outside the tank, the port allowing fluid to be moved in and out of the tank;
    a shaft that rotates according to a change in fluid level within the tank;
    a stop-fill valve assembly for transitioning between an open configuration and a closed configuration based on the rotational position of the shaft, the stop-fill valve assembly including:
        a valve shuttle that is rotationally engaged with, but longitudinally independently movable from the shaft to translate longitudinally independent of the shaft to move between an open position corresponding with the open configuration and the closed position as the shaft rotates;
        the stop-fill valve assembly including a valve body having a release slot, wherein the valve shuttle has a release rib that does not engage the release slot when the stop-fill assembly is in the open configuration, but translates longitudinally into the release slot when the valve shuttle rotates into the closed position and the stop-fill valve assembly is in the closed configuration; and
        a float positioned in the tank that moves in response to changes in fluid level in the tank and a float arm connected to the float, the float arm having a proximate and distal end, wherein the float is mounted on the distal end of the float arm away from the shaft, the proximate end of float arm engaged with the shaft such that the float arm rotates the shaft in response to changes in the fluid level in the tank.

2. The stop fill assembly of claim 1, further comprising a biasing member for biasing the stop fill valve position in the open position such that fluid can flow in to and out of the tank.

3. The stop fill assembly of claim 2, wherein the biasing member comprises a spring positioned over the shaft below the valve shuttle.

4. The stop fill assembly of claim 1, further comprising a first gear mounted on the lower end of the shaft and a second gear mounted on the proximate end of the float arm and rotationally engaged with the first gear such that the second gear rotates to drive the first gear when the float arm rotates in response to changes in the fluid level in the tank.

5. The stop fill assembly of claim 1, further comprising an indicator positioned outside the tank that provides an indication external to the tank of the fluid level in the tank.

6. The stop fill assembly of claim 5, further comprising an indicator driving member affixed to the upper end of the shaft for engaging the indicator so as to provide a visual indication of fluid level in the tank.

7. The stop fill assembly of claim 6, wherein the indicator driving member comprises a magnet.

8. The stop fill assembly of claim 7, wherein the indicator comprises a dial indicator.

9. The stop fill assembly of claim 1, further comprising an o-ring positioned between the shuttle body and the valve body.

10. The stop fill assembly of claim 1, further comprising a support member extending downwardly from the valve body, wherein a portion of the shaft is enclosed in the support member.

11. The stop fill assembly of claim 1, wherein the valve shuttle further comprises a slanted upper flow surface.

12. A valve assembly for an enclosed tank, the valve assembly comprising:
    a stop fill assembly in fluid communication with a port outside of the enclosed tank through which fluid enters the tank and leaves the tank, the stop fill assembly moveable between a normally open configuration allowing fluid to enter and exit the tank and a closed configuration wherein the stop fill assembly prevents additional fluid from entering the tank when the fluid level in the tank reaches a predetermined fill level during a filling operation in which fluid enters the tank through the port, the stop fill assembly including:
        a valve head in fluid communication with the port, the valve head having a central opening therethrough;
        a valve body including an upper surface and a lower surface, a central opening extending through the valve body, at least one release slot adjacent the central opening, one or more fill ports extending through the valve body and opening through the upper and lower surfaces of the valve body and into the tank;
        a rotatable valve shuttle that is longitudinally moveably relative to the valve body and the tank, the valve shuttle having a shuttle body including an upper surface, a lower surface, an upper shaft extending upwardly from the shuttle body and a lower shaft extending downwardly from the lower surface of the shuttle body and through the central opening of the valve body, the valve shuttle having at least one release rib extending from the shuttle body, the release rib having a lower end that supports the valve shuttle above the upper surface of the valve body when the stop fill assembly is in the open configuration such that the shuttle body and the valve head define a space therebetween whereby fluid entering the tank flows through the space and into and through the fill port into the tank; and
        a shaft that rotates according to a change in fluid level within the tank, the shaft operably coupled to the lower shaft of the valve shuttle such that the valve shuttle rotates with the shaft to move the release rib into alignment with the release slot when the fluid level in the tank reaches the predetermined fill level, the release rib translating longitudinally into the release slot when the stop fill assembly closes such that the shuttle body moves downward under the force of fluid entering the tank flowing over the shuttle body and contacts the upper surface of the valve body, thereby closing the space and blocking flow of fluid through the space and the fill port and into the tank.

13. The stop fill assembly of claim 12, further comprising a float positioned in the tank that moves in response to changes in fluid level in the tank and a float arm connected to the float, the float arm having proximate and distal ends with the float being mounted on the distal end of the float arm away from the shaft, the float arm operably engaged with the shaft such that the float arm rotates the shaft in response to changes in the fluid level in the tank.

14. The stop fill assembly of claim 12, further comprising a pair of release slots formed in the valve body adjacent to and on opposed sides of the central opening and a pair of release ribs extending from opposed sides of the shuttle body and wherein the connection between the lower shaft of the valve shuttle and the shaft is configured to permit longitudinal movement of the shuttle body relative to the valve body when the release ribs are aligned with the release slots.

15. The stop fill assembly of claim 14, further comprising a spring positioned over the lower shaft of the valve shuttle that biases the shuttle body toward the open position such that the stop fill assembly moves into the open configuration when fluid flow through the space and fill port and into the tank ceases, such that fluid can then be withdrawn from the tank through the stop fill assembly.

16. The gauge assembly of claim 15, wherein the shuttle body rotates approximately ninety degrees between the open position and the position wherein the release ribs are aligned with the release slots to enable fluid pressure from fluid entering the tank to push the shuttle body down against the biasing action of the spring.

17. The stop fill assembly of claim 12, further comprising:
    a dial indicator positioned outside the tank that provides an indication external to the tank of the fluid level in the tank; and
    an indicator driving member affixed to the upper end of the upper shaft of the valve shuttle, the indicator driving member coupled to the dial indicator whereby a rotational position of the upper shaft is translated into a visual indication of the fluid level in the tank.

18. The stop fill assembly of claim 16, wherein the indicator driving member comprises a magnet.

19. The stop fill assembly of claim 12, further comprising an elongate support member connected to and extending downwardly from the valve body, wherein at least a portion of the shaft is enclosed in the support member.

20. The stop fill assembly of claim 19, further comprising a first gear affixed to the lower end of the shaft and a second gear affixed to the proximate end of the float arm and operably engaged with the first gear such that the second gear rotates to drive the first gear when the float arm rotates relative to the support member in response to changes in the fluid level in the tank.

* * * * *